United States Patent
Fuse et al.

(10) Patent No.: US 8,055,068 B2
(45) Date of Patent: Nov. 8, 2011

(54) IMAGE PROCESSING APPARATUS AND IMAGE PROCESSING SYSTEM

(75) Inventors: Tohru Fuse, Tokyo (JP); Yukiyo Uehori, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 691 days.

(21) Appl. No.: 12/209,849

(22) Filed: Sep. 12, 2008

(65) Prior Publication Data
US 2009/0238451 A1    Sep. 24, 2009

(30) Foreign Application Priority Data
Mar. 21, 2008  (JP) .................. 2008-072834

(51) Int. Cl.
*G06K 9/00* (2006.01)
*G06K 9/34* (2006.01)
(52) U.S. Cl. ..................................... 382/165
(58) Field of Classification Search .......... 382/162, 382/164, 165, 167; 358/1.9, 1.15, 300, 515, 358/518, 520, 530; 348/157, 384.1; 345/589–591
See application file for complete search history.

(56) References Cited

U.S. PATENT DOCUMENTS

| | | | | |
|---|---|---|---|---|
| 4,884,221 | A * | 11/1989 | Sugiyama et al. | 382/165 |
| 5,638,183 | A * | 6/1997 | Hayashi et al. | 358/300 |
| 7,495,812 | B2 * | 2/2009 | Holger | 358/518 |
| 2006/0227241 | A1 * | 10/2006 | Dyke et al. | 348/384.1 |
| 2009/0028425 | A1 * | 1/2009 | Cavallaro et al. | 382/162 |
| 2009/0122368 | A1 * | 5/2009 | Saito et al. | 358/504 |
| 2009/0238451 | A1 * | 9/2009 | Fuse et al. | 382/165 |
| 2010/0110460 | A1 * | 5/2010 | Miyata | 358/1.9 |
| 2011/0032553 | A1 * | 2/2011 | Funahashi | 358/1.9 |

FOREIGN PATENT DOCUMENTS

| | | |
|---|---|---|
| JP | A-06-230897 | 8/1994 |
| JP | A-07-146929 | 6/1995 |
| JP | A-08-065485 | 3/1996 |
| JP | A-09-128518 | 5/1997 |

OTHER PUBLICATIONS

Morohara et al., "Automatic picking of Index Colors in Textile Pictures for Designers," Transactions of Information Processing Society of Japan, 1995, vol. 36, No. 2, pp. 329-337 (with Abstract).
Office Action issued in Japanese Patent Application No. 2008-072834 on Mar. 2, 2010 (with Translation).

* cited by examiner

*Primary Examiner* — Amir Alavi
(74) *Attorney, Agent, or Firm* — Oliff & Berridge, PLC

(57) ABSTRACT

An image processing apparatus includes a reading unit, a color value calculation unit, a reading period measurement unit, a color value storage unit, a color value creation unit and a color value output unit. The reading unit reads a color of each of plural objects. The color value calculation unit calculates a color value of the color of each read object. The reading period measurement unit measures a time period during which the reading unit reads each object. The color value storage unit stores the color value calculated and time period information indicating the time period measured, for each object. The color value creation unit creates a new color value based on the color values of the plurality of objects and the time period information stored in the color value storage unit. The color value output unit outputs the new color value created.

4 Claims, 7 Drawing Sheets

IMAGE PROCESSING APPARATUS AND IMAGE PROCESSING SYSTEM

CROSS-REFERENCE TO RELATED APPLICATIONS

This application is based on and claims priority under 35 USC 119 from Japanese Patent Application No. 2008-72834 filed Mar. 21, 2008.

BACKGROUND

1. Technical Field

The invention relates to an image processing apparatus and an image processing system.

2. Related Art

A color of a pen used in writing on an electronic whiteboard apparatus used in a conference or other events is primarily determined in the following two ways: (1) plural pens are prepared for respective colors to be displayed, and (2) a color to be displayed is selected from a palette displayed on the electronic whiteboard apparatus.

SUMMARY

According to an aspect of the invention, an image processing apparatus includes a reading unit, a color value calculation unit, a reading period measurement unit, a color value storage unit, a color value creation unit and a color value output unit. The reading unit reads a color of each of plural objects. The color value calculation unit calculates a color value of the color of each object read by the reading unit. The reading period measurement unit measures a time period during which the reading unit reads each object. The color value storage unit stores the color value calculated by the color value calculation unit and time period information indicating the time period measured by the reading period measurement unit, for each object. The color value creation unit creates a new color value based on the color values of the plurality of objects and the time period information stored in the color value storage unit. The color value output unit outputs the new color value created by the color value creation unit.

DETAILED DESCRIPTION

Exemplary embodiments to implement the invention will be described below with reference to the accompanying drawings.

Figure 1:
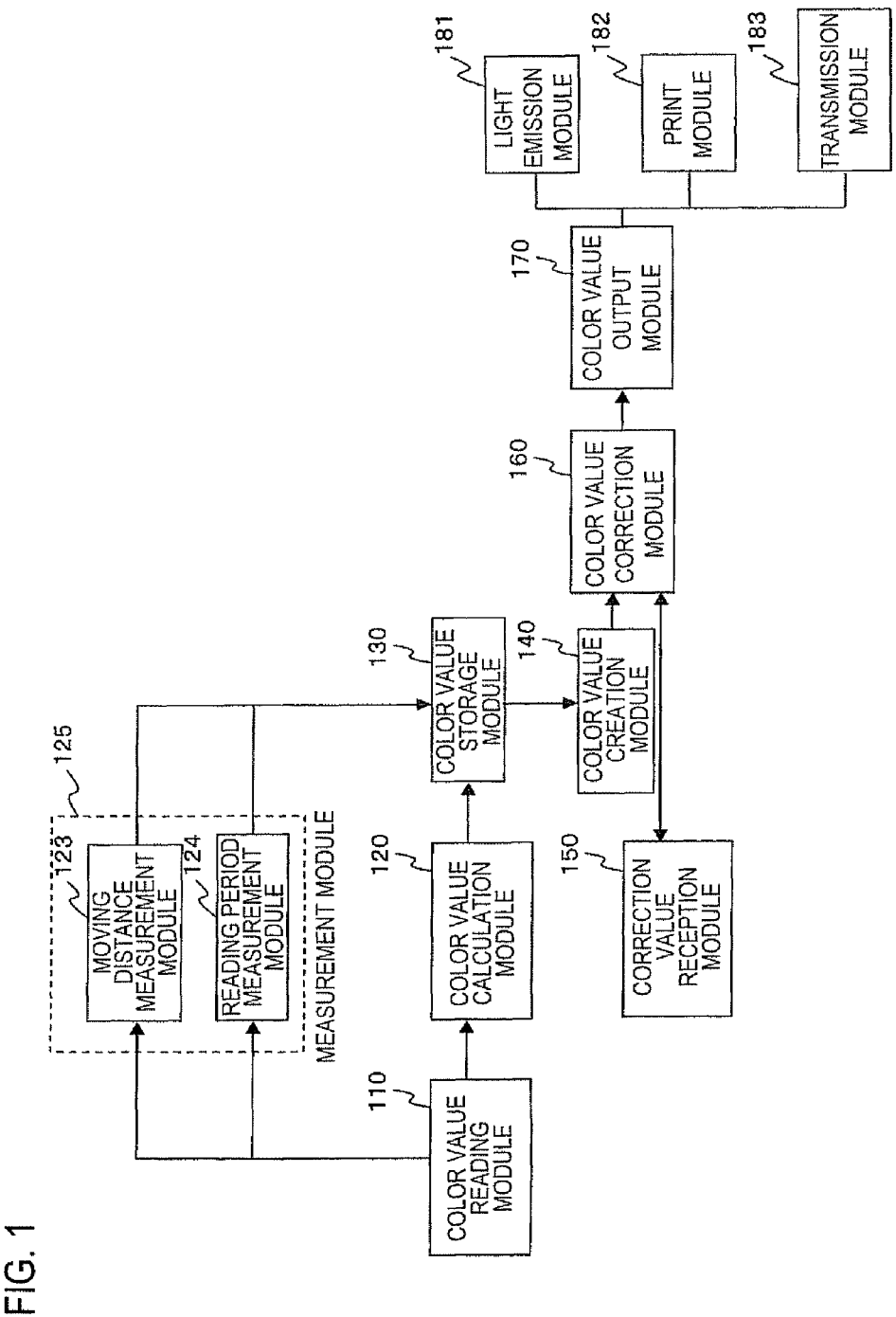
FIG. 1 is a conceptual module configuration diagram of a configuration example of an exemplary embodiment.

FIG. 1 is a conceptual module configuration diagram of a configuration example of this exemplary embodiment. A module used herein generally refers to a part, such as logically separable software (computer program) and hardware. A module in this exemplary embodiment therefore refers to not only a module in a computer program but also a module in a hardware configuration. Therefore, a computer program, a system, and a method are also described in this exemplary embodiment. However, for illustration purposes, when "stores something," "causes something to store something," and words equivalent thereto are used, these words mean, when an embodiment of interest is a computer program, that causing a storage device to store something or controlling a computer to cause a storage device to store something. Further, a module is substantially in one-to-one correspondence with a function, but in actual implementation, one program may form one module, or one program may form a plurality of modules. Conversely, a plurality of programs may form one module. Further, a plurality of modules may be executed by one computer, or one module may be executed by a plurality of computers in a distributed or parallel environment. Moreover, one module may contain another module. The term "connection" is used below not only for physical connection but also for logical connection (such as data reception, instructions, inter-data reference relationship).

The term "system" or "apparatus" means not only a combination of a plurality of computers, hardware parts, devices, and other components connected by communication means, such as a network (including peer-to-peer communication connection) but also a single computer, a hardware part, a device, or any other component. The terms "system" and "apparatus" used herein are synonyms to each other In the following description, to present a color value, light emission based on the color value is used by way of example. Light emission based on a color value may be replaced with, for example, displaying the color value itself or outputting audio representing the color value.

This exemplary embodiment includes, as shown in FIG. 1, a color value reading module 110, a color value calculation module 120, a measurement module 125 (a moving distance measurement module 123 and a reading period measurement module 124), a color value storage module 130, a color value creation module 140, a correction value reception module 150, a color value correction module 160, a color value output module 170, a light emission module 181, a print module 182, and a transmission module 183.

The color value reading module 110 is connected to the measurement module 125 and the color value calculation module 120. The color value reading module 110 reads a color value of an object, and sends the color value to the color value calculation module 120. Reading a color value specifically includes using a scanner (including a pen-shaped portable scanner, for example) to read an image. The color value reading module 110 also sends information that the measurement module 125 requires. Specifically, for example, the color value reading module 110 sends a detected light pattern for calculating a distance to the moving distance measurement module 123, and sends a read start time and a read end time to the reading period measurement module 124. The color value reading module 110 may be housed in a portable casing. In this case, the color value reading module 110 along with the color value output module 170 may be housed in a single portable casing.

The color value calculation module 120 is connected to the color value reading module 110 and the color value storage module 130. The color value calculation module 120 calculates a color value of the color of the object read by the color value reading module 110. That is, the color value received from the color value reading module 110 is converted into a value in a color space that is readily processed in this exemplary embodiment or in a destination to which the color value output module 170 outputs its result. For example, the color value calculation module 120 receives a color value in the RGB color space from the color value reading module 110, and converts the received color value into a color value in the YMC color space or the like. Then, the color value calculation module 120 sends the converted color value to the color value storage module 130.

The color value storage module 130 is connected to the color value calculation module 120, the measurement module 125, and the color value creation module 140. The color value storage module 130 stores the color value calculated by the color value calculation module 120 and time period information indicating the time period measured by the reading period measurement module 124, for each of plural objects. Alternatively, the color value storage module 130 may store the color value calculated by the color value calculation module 120 and distance information indicating the distance measured by the moving distance measurement module 123, for each of the plural objects. For example, the color value storage module 130 may be implemented by a memory or any other similar device. In response to an access from the color value creation module 140, the color value storage module 130 sends a stored color value and corresponding period information or corresponding distance information to the color value creation module 140.

The moving distance measurement module 123 is connected to the color value reading module 110 and the color value storage module 130. The moving distance measurement module 123 measures a distance by which the color value reading module 110 has moved during the reading operation carried out by the color value reading module 110. To measure a distance by which the color value reading module 110 reads a color value, for example, a technology described in JP Hei.6-230897 A may be used. The moving distance measurement module 123 sends the measured distance to the color value storage module 130.

The reading period measurement module 124 is connected to the color value reading module 110 and the color value storage module 130. The reading period measurement module 124 measures a time period during which the color value reading module 110 carries out the reading operation. The time period to be measured is a time period from a time when a color value reading operation starts to a time when the color value reading operation ends. The reading period measurement module 124 sends the measured time period to the color value storage module 130.

The measurement module 125 may be formed of either the moving distance measurement module 123 or the reading period measurement module 124, or may be formed of both the modules 123, 124 in combination. The expression "the distance by which the color value is read" and the expression "the period during which the color value is read" respectively mean a distance by which the same color value (here, the same color value includes the same color value and equivalent color values thereto; the same thing applies to the following description) is read and a time period during which the same color value is read.

The color value creation module 140 is connected to the color value storage module 130 and the color value correction module 160. The color value creation module 140 creates a new color value based on the color values of the plural objects and the time period information corresponds to the color values, which are stored in the color value storage module 130. Alternatively, the color value creation module 140 may create a new color value based on the color values of the plural objects and the distance information corresponding to the color values, which are stored in the color value storage module 130. That is, the color value creation module 140 accesses the color value storage module 130 to read the plural color values and the time period information or the distance information that corresponds to the color values, determines a mixing ratio in accordance with the time period information or the distance information, and combines the plural values using the mixing ratio to create a new color value.

The correction value reception module 150 is connected to the color value correction module 160. The correction value reception module 150 receives information for correcting the new color value created by the color value creation module 140, and sends a correction value based on the information to the color value correction module 160.

The color value correction module 160 is connected to the color value creation module 140, the correction value reception module 150, and the color value output module 170. The color value correction module 160 receives the new color value created by the color value creation module 140 and the correction value from the correction value reception module 150, and corrects the created color value based on the correction value. The correction herein includes changing a color value to an appropriate one in accordance with an output device to which this exemplary embodiment sends an output. Then, the color value correction module 160 sends the corrected color value to the color value output module 170.

The correction value reception module 150 and the color value correction module 160 will be described in more detail.

The color value reading module 110 measures a color and expresses the measured color in a value dependent on the characteristics of a reading device. Also, to output the visually same color as the measured color or a color approximate to the measured color, it is necessary to convert the measured color in accordance with the characteristics of an output device before the output operation.

The color value calculation module 120 converts the color value received from the color value reading module 110 into a value in a color space independent of the reading device, for example, the sRGB color space defined in IEC61966-2-1. Also, when the converted color value in the sRGB color space is output, it may be necessary to convert the converted color value in the sRGB color space into a color value dependent on the characteristics of an output device. The color value correction module 160 carries out this conversion.

The correction value reception module 150 receives designation of an output device. In this exemplary embodiment, the output destination can be selected from the three modules: the light emission module 181, the print module 182, and the transmission module 183. The correction value reception module 150 receives designation of one of the three modules or designation of a combination of any of the three modules, and sends a correction value according to the designated output device to the color value correction module 160. The color value correction module 160 receives the correction value from the correction value reception module 150 and corrects the color value in accordance with the output device.

The color value output module 170 is connected to the color value correction module 160, the light emission module 181, the print module 182, and the transmission module 183. The color value output module 170 outputs the color value received from the color value correction module 160 to any one of the light emission module 181, the print module 182, and the transmission module 183, or a combination of any of them.

The light emission module 181 is connected to the color value output module 170, and emits light based on the color value received from the color value output module 170. Emitting light based on a certain color value is emitting light having the same color value as the certain color value. Specifically, emitting light based on a color value corresponds to, for example, causing a light emitting diode (LED) for reproducing the color value to emit light.

The print module 182 is connected to the color value output module 170, and carries out printing based on the color value received from the color value output module 170. The printing simply includes outputting, for example, an ink dye having the same color value as the color value. Specifically, the printing corresponds to, for example, using ink jetting or any other similar method that reproduces the color value to carry out the printing.

The transmission module 183 is connected to the color value output module 170, and transmits the color value received from the color value output module 170 to another information processing apparatus via a communication medium. For example, such an information processing apparatus includes an electronic whiteboard apparatus, and the electronic whiteboard apparatus displays the received color value in a position specified by a user.

Figure 2:
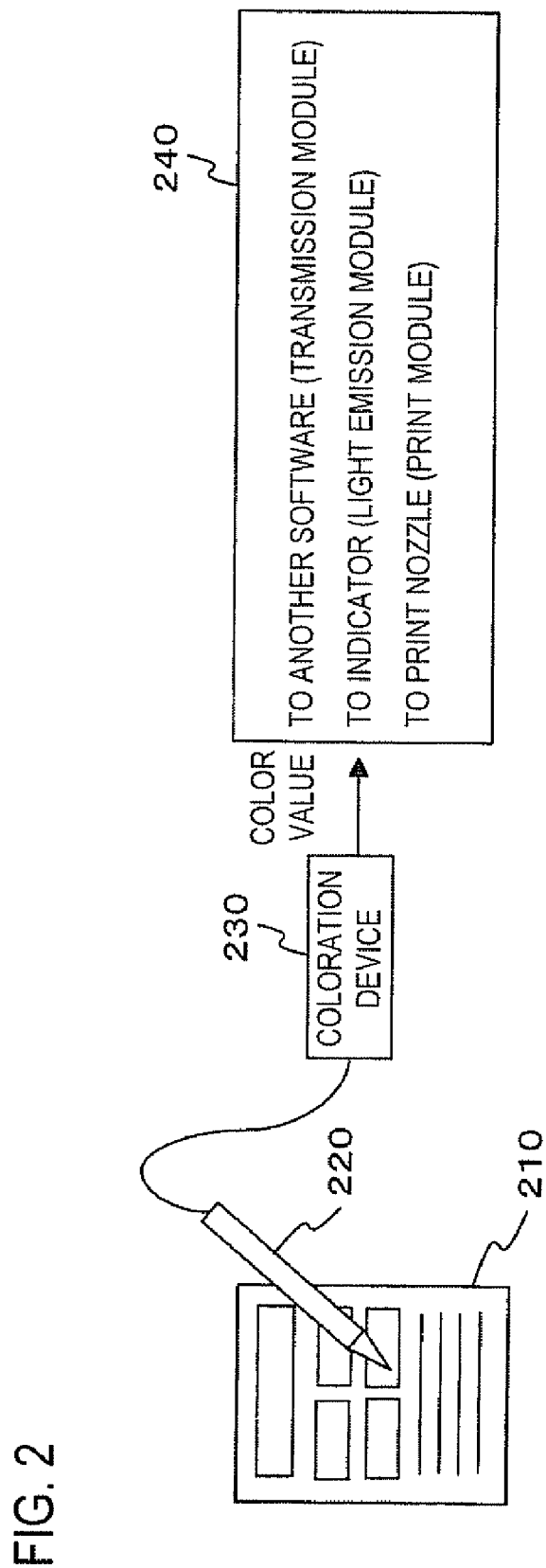
FIG. 2 is an explanatory diagram showing a configuration example for implementing the exemplary embodiment.

FIG. 2 is an explanatory diagram showing a configuration example for implementing this exemplary embodiment. This exemplary embodiment includes a color value reading pen 220 and a coloration device 230.

The color value reading pen 220 includes the color value reading module 110. The coloration device 230 includes the color value calculation module 120 to the color value output module 170. An external processing device 240 includes the light emission module 181 to the transmission module 183.

A user uses the color value reading module 110 disposed at the tip of the color value reading pen 220 to read a color value of a partial area in a printed matter 210. The user repeats this operation several times. The color value reading module 110 in the color value reading pen 220 reads a color value of a partial area whenever this operation is repeated, and sends the color value to the coloration device 230.

The coloration device 230 converts the color values read by the color value reading pen 220, creates a new color value, corrects the new color value, carries out other processing, and then sends the result to the external processing device 240.

The external processing device 240 processes the color value received from the coloration device 230. Specifically, the external processing device 240 uses the transmission module 183 to transmit the color value to software for handling the color value. For example, when the transmission destination is a drawing software program that carries out drawing on an electronic whiteboard, a position where the user touches the electronic whiteboard with the color value reading pen 220 may be detected, and a pixel having the received color value may be displayed in that position. Alternatively, the light emission module 181 may be instructed as an indicator to emit light representing the color value. Still alternatively, the print module 182 may be used to output an ink representing the color value from a print nozzle.

Figure 3:
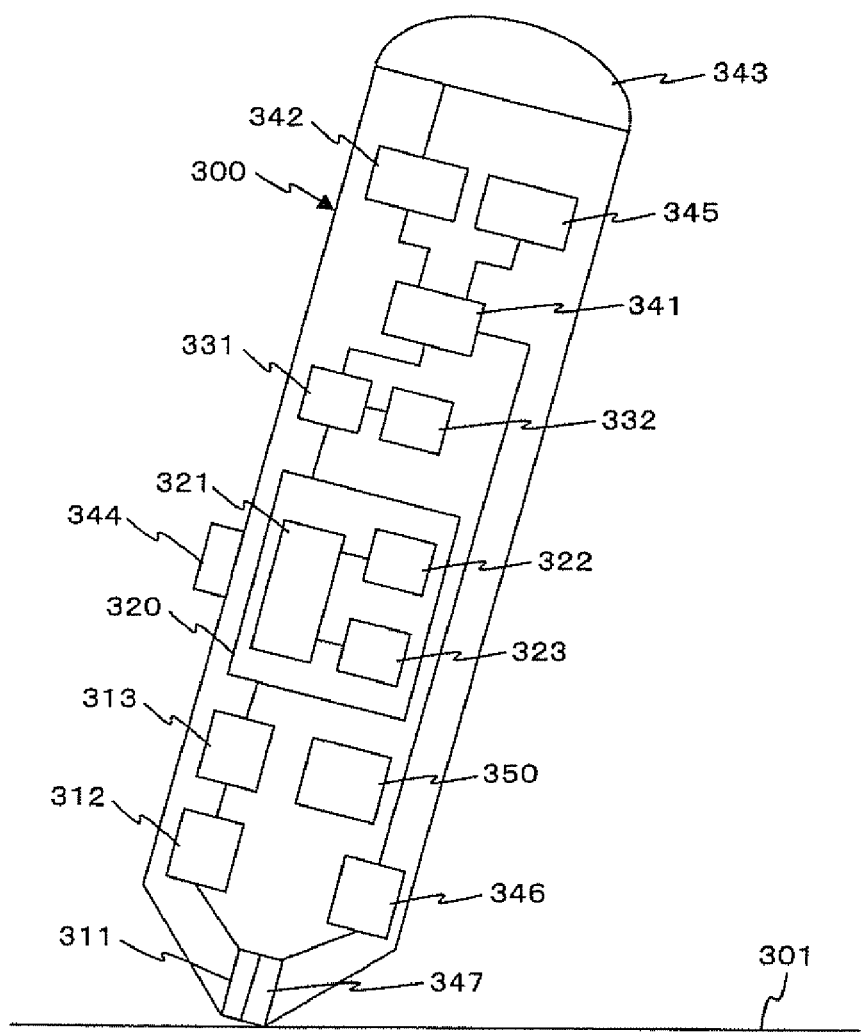
FIG. 3 is an explanatory diagram showing a configuration example for implementing the exemplary embodiment.

FIG. 3 is an explanatory diagram showing a configuration example for implementing this exemplary embodiment. In the configuration example shown in FIG. 2, the color value reading pen 220 and the coloration device 230 are separately provided, whereas in the configuration example shown in FIG. 3, the color value reading pen 220 and the coloration device 230 are housed in a coloration pen 300 that constitutes a portable casing.

The coloration pen 300 includes a CCD (Charge Coupled Device) 311, a color value conversion module 312, a memory 313, a color value creation module 320, a correction module 331, a correction value reception module 332, an output module 341, a light emission control module 342, a light emission module 343, an instruction button 344, a communication module 345, a print control module 346, a print head 347, and a control module 350.

The control module 350 controls the entire coloration pen 300. For example, the control module 350 detects an event that a user operates the instruction button 344, and controls a timing at which the output module 341 outputs a color value.

A user operates the instruction button 344, and the event of operation is notified to the control module 350, an action detection module 322, or another module. Examples of such operation include starting an operation of reading a color value, terminating the reading operation, starting transmitting of a created color value, and terminating the transmission. These operations may be distinguished by, for example, the number of presses of the instruction button 344 and a position to which the instruction button 344 is rotated.

The CCD 311 is connected to the color value conversion module 312, and reads a color value of an area in a printed matter 301 located in the vicinity of the CCD 311. The read color value is sent to the color value conversion module 312.

The color value conversion module 312 is connected to the CCD 311 and the memory 313. The color value conversion module 312 performs color conversion on the color value received from the CCD 311. The color value that has undergone the color conversion is stored in the memory 313.

The memory 313 is accessed by the color value conversion module 312 and the color value creation module 320. The memory 313 stores the color value that has undergone the color conversion in the color value conversion module 312. The color value is read by the color value creation module 320.

The color value creation module 320 is connected to the memory 313 and the correction module 331. The color value creation module 320 creates a new color value based on the color values obtained in plural reading operations and stored in the memory 313, and sends the created color value to the correction module 331.

The color value creation module 320 includes a color value creation process module 321, the action detection module 322, and a timekeeping module 323.

The action detection module 322 is connected to the color value creation process module 321. The action detection module 322 detects an event that the instruction button 344 is operated, and instructs the color value creation process module 321 to create a color value. The action detection module 322 also measures a distance by which a color value is read, and stores the distance information in the memory 313 in association with the read color value. The action detection module 322 detects an event that a user operates the instruction button 344 to start reading, and distinguishes the operation as a single color value reading operation. Whenever a certain number of reading operations are performed, or when the action detection module 322 detects an event that the user operates the instruction button 344 to terminate the reading, the action detection module 322 instructs the color value creation process module 321 to create a new color value based on the read color values. The action detection module 322 may also be configured to detect a motion (gesture) performed by using the entire coloration pen 300. For example, horizontal detection is carried out to detect an inclination of the coloration pen 300, or a motion of the coloration pen 300 is detected from based on acceleration acting thereon. Then, start of reading a color value, termination of the reading, or another operation may be determined based on these detection results.

The timekeeping module 323 is connected to the color value creation process module 321. The timekeeping module 323 measures a time period during which the action detected by the action detection module 322 is performed, and stores the time period information in the memory 313 in association with the read color value. For example, the time keeping module 323 measures a time period during which a color value is read in the same position. Also, the timekeeping module 323 measures a time period during which the same color value is read.

The color value creation process module 321 is connected to the action detection module 322 and the timekeeping module 323. The color value creation process module 321 creates a new color value based on color values and the distance information or the time period information, which are obtained in plural reading operations and stored in the memory 313, in response to an instruction from the action detection module 322. A mixing ratio used in creating a color value will be described later.

The correction module 331 is connected to the color value creation module 320, the correction value reception module 332, and the output module 341. The correction module 331 corrects the color value created by the color value creation module 320 based on a correction value received from the correction value reception module 332. The correction module 331 sends the corrected color value to the output module 341.

The correction value reception module 332 is connected to the correction module 331. The correction value reception module 332 receives information that determines a correction value used to correct a color value, and sends the correction value corresponding to the information to the correction module 331. The correction value is determined in accordance with an output device to which a color value is output. Instead of such information that determines a correction value, the correction value reception module 332 may receive a correction value itself. For example, when the communication module 345 is used to transmit a color value to an external information processing device, a correction value may be received from the external information processing device. When an output destination is the print head 347, a correction value based on the property of a dye output from the print head 347 may be received from the print control module 346. Similarly, when an output destination is the light emission module 343, a correction value based on the color value of light emitted from the light emission module 343 may be received from the light emission control module 342.

The output module 341 is connected to the correction module 331, the light emission control module 342, the communication module 345, and the print control module 346. The output module 341 receives the color value from the correction module 331, and outputs the color value to any one of the light emission control module 342, the communication module 345, and the print control module 346, or a combination of any of them.

The light emission control module 342 is connected to the output module 341 and the light emission module 343. The light emission control module 342 receives the color value from the output module 341, and causes the light emission module 343 to emit light based on the color value.

The communication module 345 is connected to the output module 341. The communication module 345 receives a color value from the output module 341, and transmits the color value to an external information processing device.

The print control module 346 is connected to the output module 341 and the print head 347. The print control module 346 receives a color value from the output module 341, and controls the print head 347 based on the color value to carry out printing on an object to be printed.

Figure 4:
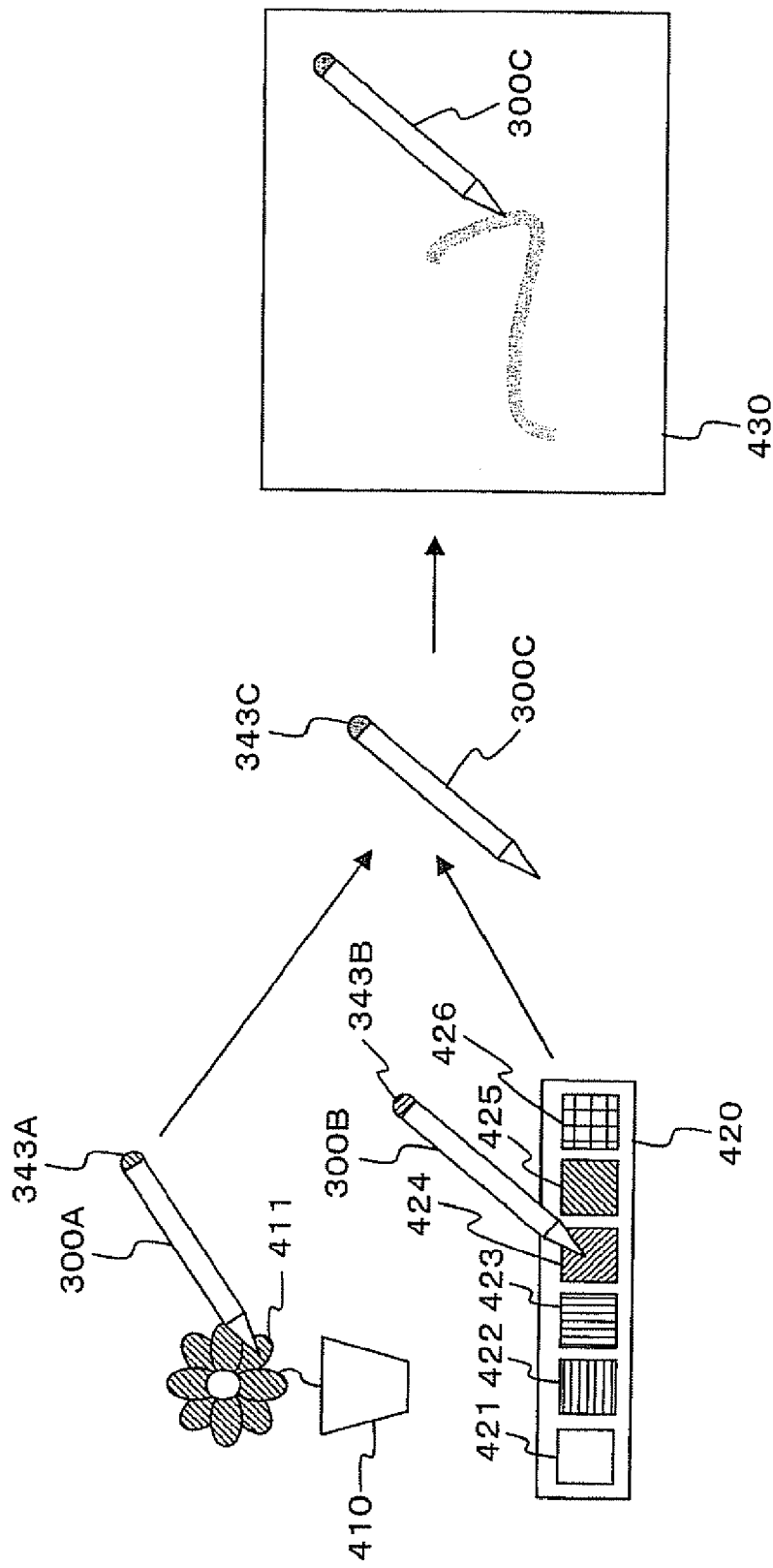
FIG. 4 is an explanatory diagram showing an example of how to use the exemplary embodiment.

FIG. 4 is an explanatory diagram showing an example of how to use this exemplary embodiment.

Coloration pens 300A, 300B, and 300C in FIG. 4 is the coloration pen 300 described with reference to FIG. 3, and the coloration pens 300A, 300B, and 300C show temporal transition of the coloration pen 300.

Description will be given on the case where a new color value is created, as a color of the coloration pen 300 (300C) which is operated by a user to draw on an electronic whiteboard 430, based on the color value of a target read area 411 (petal) in an object 410 and the color value of a color sample 424 in a color chart 420.

When the coloration pen 300 reads a color value of the target read area 411, which is a part of the object 410, the coloration pen 300 changes its state into the coloration pen 300A. When the coloration pen 300 (300A) reads the color value of the color sample 424 in the color chart 420, the coloration pen 300 then changes its state from the coloration pen 300A into the coloration pen 300B. When the coloration pen 300 (300B) creates a new color value, the coloration pen 300 changes its state from the coloration pen 300B into the coloration pen 300C. In the state of the coloration pen 300A, the color value of the target read area 411 is read, and then the light emission module 343A emits light having the read color value. Similarly, in the state of the coloration pen 300B, the color value of the color sample 424 is read, and then the light emission module 343B emits light having the read color value. In the state of the coloration pen 300C, a new color value is created based on the two read color values, and then the light emission module 343C emits light having the newly created color value. In each of the reading processes, a user operates the instruction button 344 on the coloration pen 300 to instruct the coloration pen 300 to start the reading operation. After the reading operations performed on the target read area 411 and the color sample 424 are completed, and the user operates the instruction button 344 to instruct the coloration pen 300 to terminate the reading, a new color value is created based on the color value read from the target read area 411 and the color value read from the color sample 424. The user confirms the color of the light emitted from the light emission module 343C, and then draws on the electronic whiteboard 430 by using the coloration pen 300 (300C). That is, the communication module 345 in the coloration pen 300 transmits the newly created color value to the electronic whiteboard 430, and the drawing software installed in the electronic whiteboard 430 receives the color value and draws a line having the newly created color value on the electronic whiteboard 430.

Figure 5:
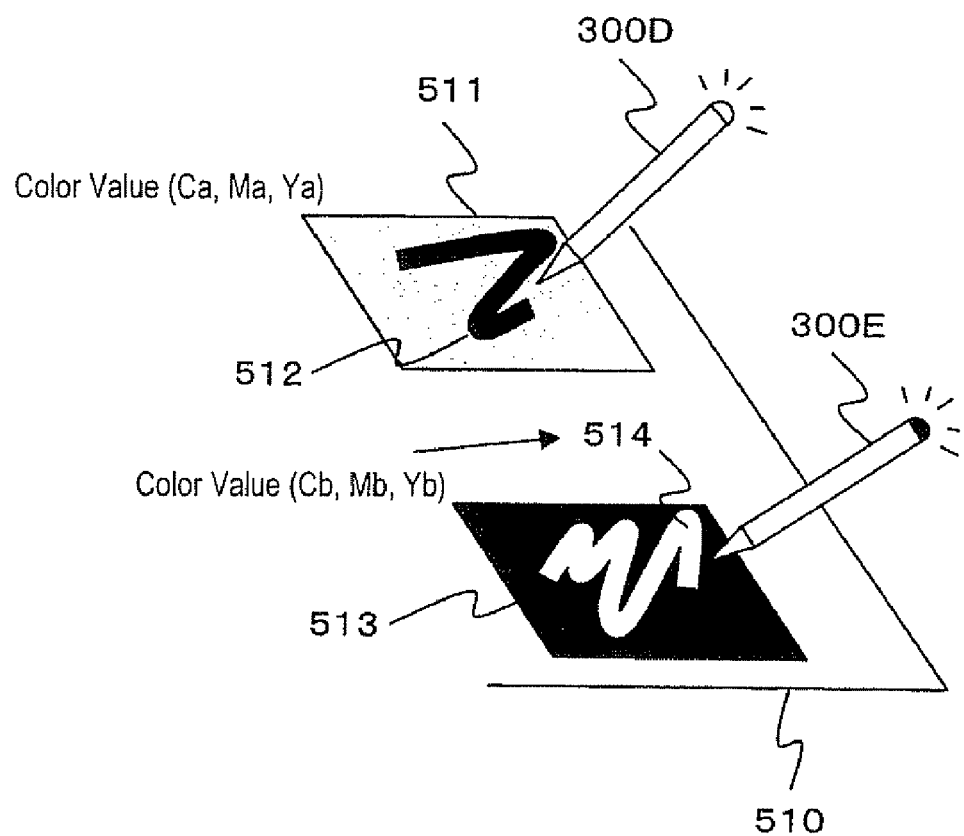
FIG. 5 is an explanatory diagram showing an example of how to create a new color value.

FIG. 5 is an explanatory diagram showing an example of how to create a new color value. That is, description will be given on an example in which the color value creation process module 321 determines a mixing ratio used in creating a new color value based on two color values.

Each of coloration pens 300D and 300E in FIG. 5 is the coloration pen 300 described with reference to FIG. 3, and the coloration pens 300D and 300E show temporal transition of the coloration pen 300.

The coloration pen 300D reads a color value of a color sample 511. It is assumed that the color value read here is expressed as $(C_a, M_a, Y_a)$ in the CMY color space. Also, let A be either the distance information, the time period information or the combination thereof (hereinafter may be collectively referred to as "distance information") of a read area 512 when the color value is read (in FIG. 5, although the trajectory of the tip (CCD 311) of the coloration pen 300D is illustrated with black, the read color value is that of the color sample 511). Similarly, the coloration pen 300E reads a color value of a color sample 513. It is assumed that the color value read here is (Cb, Mb, Yb). Also, let B be the distance information of a read area 514 when the color value is read (in FIG. 5, although the trajectory of the tip (CCD 311) of the coloration pen 300E is illustrated with white, the read color value is that of the color sample 513). The light emission module 343 of the coloration pen 300 (300D and 300E) emits light having colors of the color samples 511 and 513 during the color measurement operations.

A new color value (C, M, Y) created based on two color values is expressed by the following equation 1. That is, the mixing ratio depends on the distance information of the read color values. More specifically, a ratio of the distance information of each of plural color values to the sum of the distance information which are obtained when the plural color values are read. In the example shown in FIG. 5, since the distance of the read area 514 is longer than the distance of the read area 512, the mixing ratio for the color value (Cb, Mb, Yb) of the color sample 513 is larger than that for the color value (Ca, Ma, Ya) of the color sample 511.

$$\begin{pmatrix} C \\ M \\ Y \end{pmatrix} = \begin{pmatrix} Ca \\ Ma \\ Ya \end{pmatrix} \frac{A}{A+B} + \begin{pmatrix} Cb \\ Mb \\ Yb \end{pmatrix} \frac{B}{A+B} \quad (1)$$

In general, to create a new color value based on plural color values (N colors), let the n-th read color be defined as the following equation 2 and Sn be representing the distance information obtained when the color value is read. The newly created color value C can then be expressed, for example, by the following equation 3.

The color value for the color number n: (Cn, Mn, Yn) (2)

$$\sum_{n=1}^{N} \left( Cn \times \frac{Sn}{\sum_{k=1}^{N} Sk} \right) \quad (3)$$

Both a reading distance and a reading time period may be used to determine a mixing ratio. It is noted that a distance measured by the action detection module 322 is used as the reading distance, and a time period measured by the timekeeping module 323 is used as the reading time period.

Figure 6:
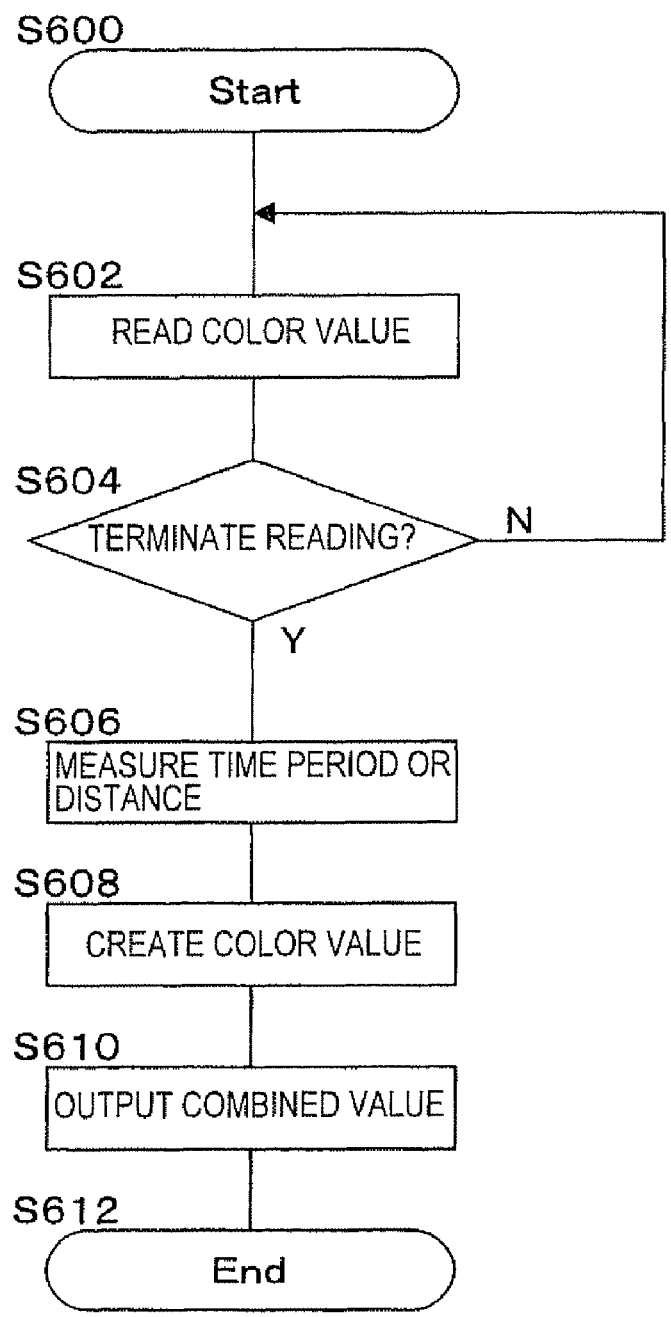
FIG. 6 is a flowchart showing an example of a process performed in the exemplary embodiment.

FIG. 6 is a flowchart showing an example of a process performed in this exemplary embodiment. In this process example, the coloration pen 300 creates a color value in accordance with a ratio of distance information.

In step S602, the CCD 311 of the coloration pen 300 reads a color value of the printed matter 301. The color value conversion module 312 performs the color conversion on the read color value undergoes color conversion, and the converted color value is stored in the memory 313.

In step S604, the process proceeds to step S606 if the action detection module 322 detects an event that the instruction button 344 is operated to terminate the reading operation, otherwise the process returns to the step S602.

In step S606, the timekeeping module 323 or the action detection module 322 measures the reading time period or the reading distance for each color value read in the step S602, and stores the result in the memory 313 in association with the color value.

In step S608, the color value creation process module 321 creates a new color value in accordance with the color values read in the step S602 and the distance information determined in the step S606. The correction module 331 then corrects the created color value.

In step S610, the output module 341 outputs the color value created and corrected in the step S608 to the light emission control module 342 and the like.

Figure 7:
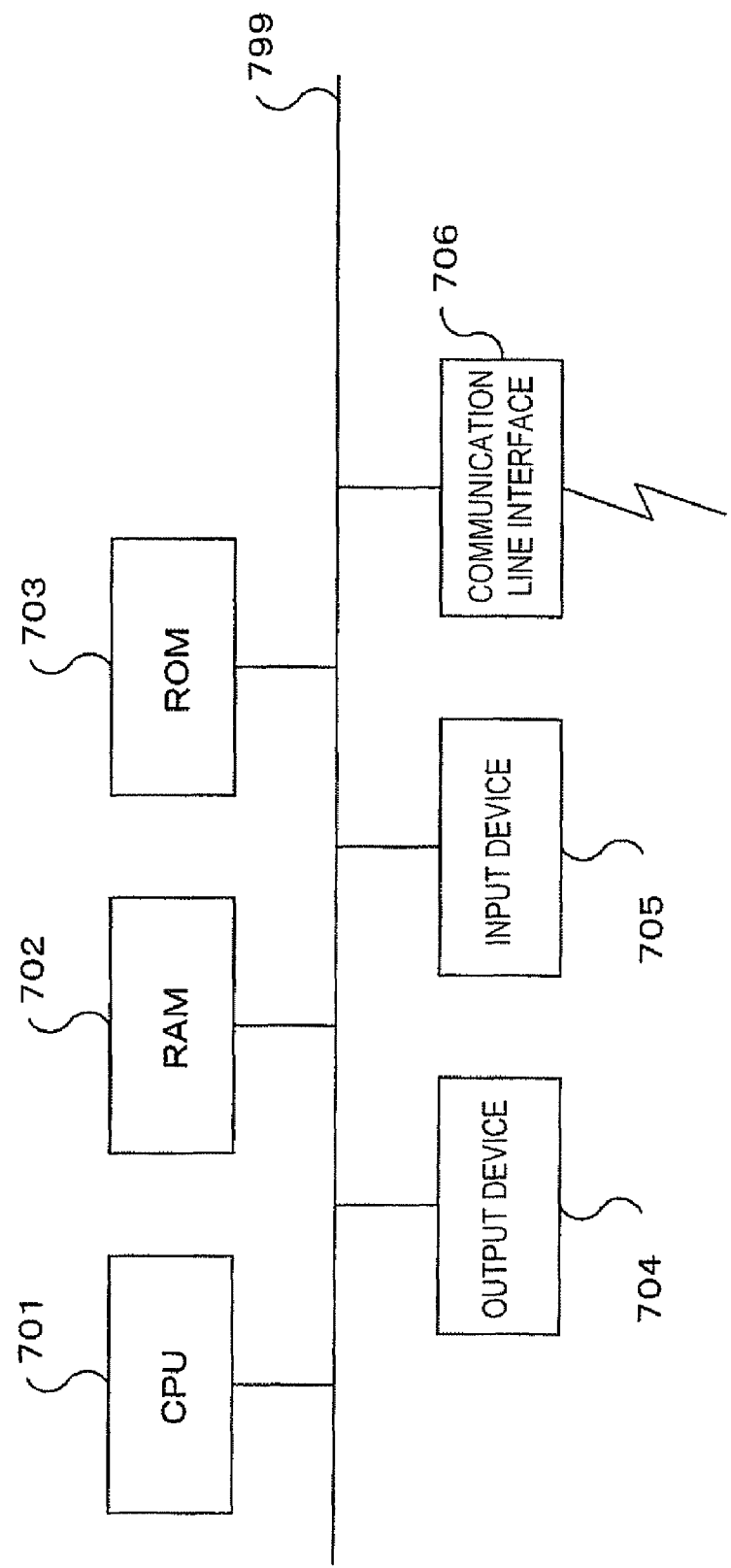
FIG. 7 is a block diagram showing an exemplary hardware configuration of a computer used to implement the exemplary embodiment.

The hardware configuration of a computer on which a program implementing this exemplary embodiment is executed is a general-purpose computer, as illustrated in FIG. 7. Specific examples of such a computer include a personal computer and a mobile computer that controls the coloration pen 300 or the like. The computer includes a CPU 701 that executes programs, such as the color value calculation module 120, the color value creation module 140, and the color value correction module 160; a RAM 702 that stores such programs and data, such as color values; a ROM 703 that stores, for example, a program for starting the computer; an input device 705 to which data is input, such as the instruction button 344; an output device 704 that corresponds to the light emission module 343 and the like; a communication line interface 706 (a network interface card can be used, for example) that corresponds to the communication module 345 for connecting the computer to an external information processing device; and a bus 708 that connects the above components to one another for data communication.

For the portions implemented by computer programs in the above exemplary embodiment, computer programs, which are software programs, are installed in a hardware configuration system. The hardware and software resources then cooperate to implement the embodiment described above.

The hardware configuration shown in FIG. 7 is presented by way of example, and this exemplary embodiment is not limited to the configuration shown in FIG. 7, but may be any other configurations as long as they can execute the modules described in this exemplary embodiment. For example, part of the modules may be formed of dedicated hardware (ASICs and the like, for example), and another part of the modules may be in an external system and connected over a communication line.

While the above exemplary embodiment has been described primarily with reference to the case where a new color value is created based on two color values, a new color value may be created based on three or more color values.

When colors are combined many times, a color to be output approaches black (for subtractive color mixing). To address this phenomenon, a density adjustment module that can dilute a color may be provided to read and mix "white". The color value reading module 110 may, of course, serve as the density adjustment module. Alternatively, the color value correction module 160 may serve as the density adjustment module. That is, when a color value created by the color value creation module 140 has a predetermined value or smaller, the color value correction module 160 may use a correction value for diluting the color value to correct the color value. When additive color mixing is used, the opposite approach is taken.

The density adjustment module, when used to read a color value for combination, may obtain information as to whether an output device to which the color value output module 170 outputs its result (such as the light emission module 181, the print module 182, and the transmission module 183) has a subtractive or additive color mixing characteristic. For example, the density adjustment module adds white to increase the brightness when the output device has a subtractive color mixing characteristic (such as a printer). On the other hand, when the output device has an additive color mixing characteristic (such as an LED and a display), the brightness may be reduced because combining colors many times conversely causes the color to approach white.

While the description has been made using equations, those equivalents to the equations may also be used. Equivalents include not only the equations themselves but also modification of the equations to the extent that the modification does not affect final results and solving the equations algorithmically.

The program described above may be provided in the form of a storage device on which the programs are stored, or may be provided through communication means. In this case, the program described above may be, for example, considered as an aspect of the invention, "a computer-readable recording medium on which a program is stored."

The "computer-readable recording medium on which a program is stored" refers to a computer-readable recording medium on which a program is stored that is used, for example, to install, execute, and distribute the program.

Examples of the recording medium include digital versatile disks (DVDs), such as "DVD-R, DVD-RW, and DVD-RAM," which are standards defined by the DVD forum, and "DVD+R and DVD+RW," which are standards defined as DVD-RWs; compact disks (CDs), such as a read-only memory (CD-ROM), a CD recordable (CD-R), and a CD rewritable (CD-RW); magneto-optical disks (MOs); flexible disks (FDs); magnetic tapes; hard disk drives; read-only memories (ROMs); electrically erasable/programmable read-only memories (EEPROMs); flash memories; and random access memories (RAMs).

The program described above and part thereof may be, for example, recorded on any of the recording media described above, stored, and distributed. Further, the program described above and part thereof may be transmitted through communication using a transmission medium, such as wired networks including a local area network (LAN), a metropolitan area network (MAN), a wide area network (WAN), the Internet, an intranet, and an extranet; wireless communication networks; and combinations thereof, or may be transmitted on a carrier wave.

Moreover, the program described above may be part of another program, or may be recorded on a recording medium along with another separate program. The program described above may be divided and recorded on a plurality of recording media. The program described above may be recorded in any form, for example, in a compressed or encrypted form, as long as it is restorable.

What is claimed is:

1. An image processing apparatus comprising:
a reading unit that reads a color of each of a plurality of objects;
a color value calculation unit that calculates a color value of the color of each object read by the reading unit;
a reading period measurement unit that measures a time period during which the reading unit reads each object;
a color value storage unit that stores the color value calculated by the color value calculation unit and time period information indicating the time period measured by the reading period measurement unit, for each object;
a color value creation unit that creates a new color value based on the color values of the plurality of objects and the time period information stored in the color value storage unit; and
a color value output unit that outputs the new color value created by the color value creation unit.

2. An image processing apparatus comprising:
a reading unit that reads a color of each of a plurality of objects;
a color value calculation unit that calculates a color value of the color of each object read by the reading unit;
a moving distance measurement unit that measures a distance by which the reading unit has moved during the reading carried out by the reading unit;
a color value storage unit that storing the color value calculated by the color value calculation unit and distance information indicating the distance measured by the moving distance measurement unit for each object;
a color value creation unit that creates a new color value based on the color values of the plurality of objects and the distance information stored in the color value storage unit; and
a color value output unit that outputs the new color value created by the color value creation unit.

3. An image processing system comprising:
a portable reading unit that reads a color of each of a plurality of objects;
a color value calculation unit that calculates a color value of the color of each object read by the reading unit;
a reading period measurement unit that measures a time period during which the reading unit reads each object;
a color value storage unit that stores the color value calculated by the color value calculation unit and time period information indicating the time period measured by the reading period measurement unit, for each object;
a color value creation unit that creates a new color value based on the color values of the plurality of objects and the time period information stored in the color value storage unit; and
a color value output unit that outputs the new color value created by the color value creation unit.

4. An image processing system comprising:
a portable reading unit that reads a color of each of a plurality of objects;
a color value calculation unit that calculates a color value of the color of each object read by the reading unit;
a moving distance measurement unit that measures a distance by which the reading unit has moved during the reading carried out by the reading unit;
a color value storage unit that storing the color value calculated by the color value calculation unit and distance information indicating the distance measured by the moving distance measurement unit, for each object;
a color value creation unit that creates a new color value based on the color values of the plurality of objects and the distance information stored in the color value storage unit; and
a color value output unit that outputs the new color value created by the color value creation unit.

* * * * *